United States Patent [19]
House

[11] 3,733,652
[45] May 22, 1973

[54] DEVICE FOR MOLDING PATTIES AND THE LIKE

[76] Inventor: Eugene R. House, R.D. 1, Emporium, Pa. 15834

[22] Filed: June 24, 1971

[21] Appl. No.: 156,192

[52] U.S. Cl..................................................17/32
[51] Int. Cl..............................................A22c 7/00
[58] Field of Search............................................17/32

[56] References Cited
UNITED STATES PATENTS

| | | | |
|---|---|---|---|
| 2,187,511 | 1/1940 | Baxter | 17/32 |
| 2,101,755 | 12/1937 | Rosenstone et al. | 17/32 |
| 2,500,973 | 3/1950 | Ackerman | 17/32 |

Primary Examiner—Lucie H. Laudenslager
Attorney—Albert H. Kirchner

[57] ABSTRACT

A molding device for hamburger patties and the like has a mold, or a plurality of stacked molds, each providing a through cavity and each covered by a cut-off blade, all mounted on an imperforate base surface and all pivoted thereon in communication with a supply hopper so that the molds can be loaded after the blades have been swung out, the blades can then be swung in to cut off the material in them from the hopper and from the other molds, and the molds can then be swung out to discharge the patties.

9 Claims, 6 Drawing Figures

INVENTOR
EUGENE R. HOUSE

Albert H. Kirchner
ATTORNEY

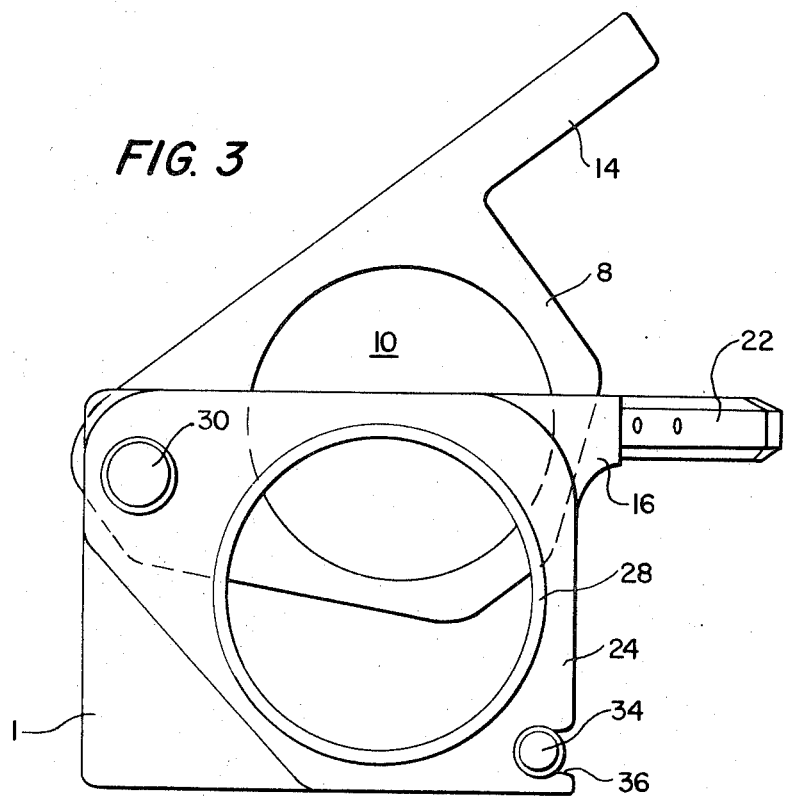
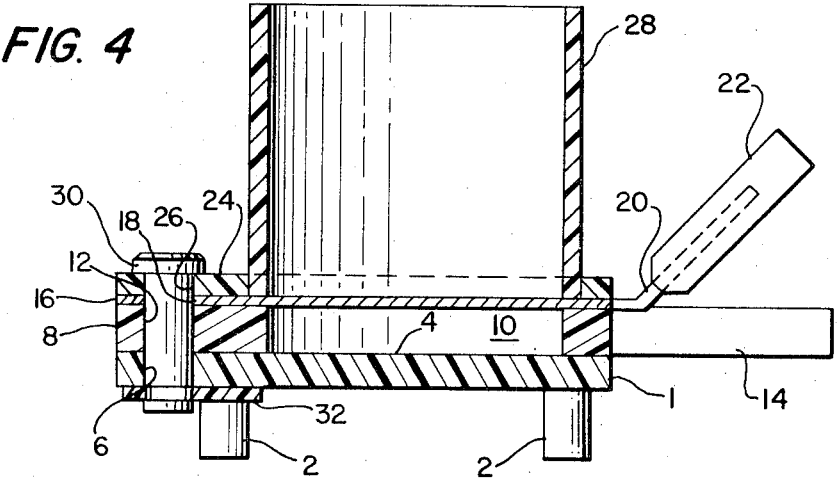

3,733,652

INVENTOR
EUGENE R. HOUSE

ATTORNEY 3,733,652

DEVICE FOR MOLDING PATTIES AND THE LIKE

DESCRIPTION

BACKGROUND OF THE INVENTION

The prior art provides a number of machines of different kinds for large scale operations in factories, large restaurants, and suppliers thereof, for making hamburger patties and analogous prepared or semi-prepared cakes of ground meat, crabmeat, sausage and the like. Such machines are invariably large, expensive, complex and hence of no interest to the housewife, the picknicker or backyard charcoal grille cook, or even to the small restaurateur or lunch stand operator, all of whom engage only in very limited patty making and necessarily prefer simple manual shaping of the material to investing in and maintaining any elaborate machine.

The prior art is believed to be lacking in a simple and inexpensive hand-operated device satisfying the requirements of the householder and very small professional for something better than hand molding and wholesale production line operation, and it is this requirement that the present invention is intended to supply.

SUMMARY OF THE INVENTION

The invention may be embodied in the form of a single patty mold, or a plural patty mold, the device in each case being small, simple and hand-operated and producing patties of uniform size, shape and density, whether singly or in multiple, by a mold, or a stack of molds, supplied from a hopper, with cut-off blade means and pivotal mounting of the mold or molds between loading position under the hopper and discharge position outwardly swung therefrom.

Examples of these two embodiments, selected as forms of the invention which have been reduced to practice and found to give satisfactory results, so that they are presently preferred, are shown in the accompanying drawings which will now be described.

SHORT DESCRIPTION OF THE FIGURES

In the accompanying drawings,

FIG. 3 is a similar top plan view, but showing the device in a different stage of operation;

FIG. 4 is a central vertical cross sectional view, taken on line 4-4 of FIG. 1;

DESCRIPTION OF THE PREFERRED EMBODIMENTS

Figure 1:
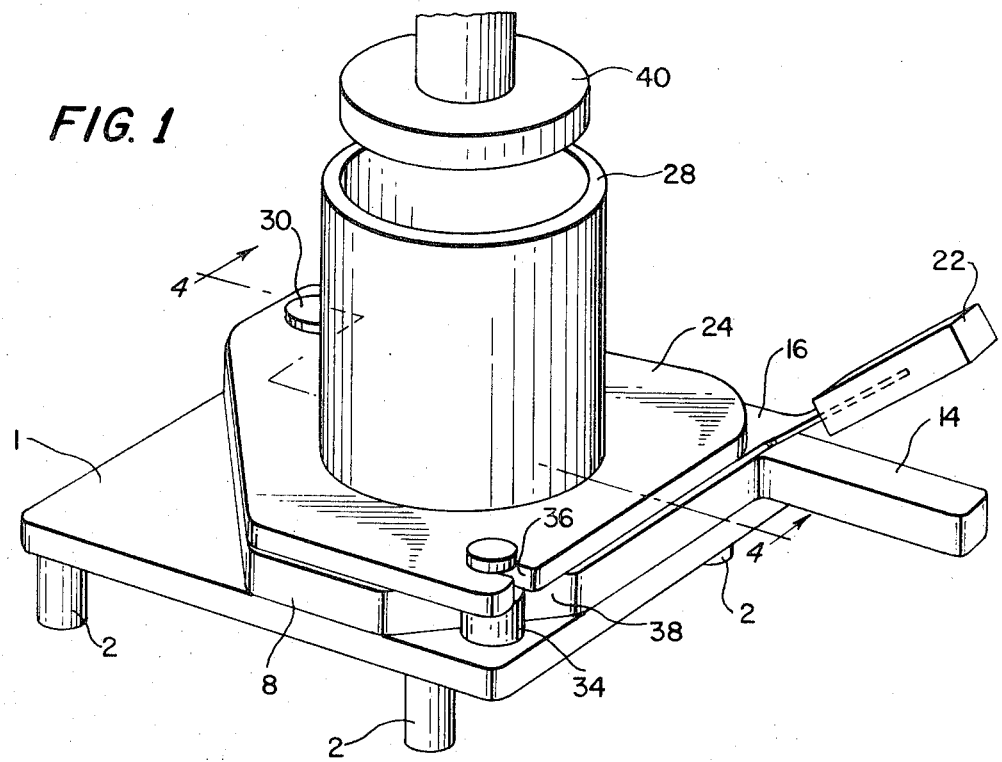
FIG. 1 is a perspective view of a device embodying the principles of the invention, designed for single patty production.

As shown in the foregoing figures, the invention comprises a molding device for manual operation in producing patties or cakes of such materials as comminuted comestibles constituting a cohesive plastic or semi-plastic mass typified by hamburgers, sausage cakes, crab cakes and the like.

The general objects of the invention are to provide a simple apparatus or device of the type hereinabove explained which will be inexpensive to make, easy to use and to clean, safe, certain and foolproof in operation, and versatile for use with any of a wide range of materials and for single patty molding or multiple patty production as may be required by the user.

In the figures, the reference numeral 1 designates a base formed and proportioned to provide a platform which may be of generally square plan, mounted in horizontal position on four short corner feet 2. The base could be made of hard wood, or metal such as stainless steel, but I prefer to form it of one of the well known plastics, such as polyethylene, polypropylene, nylon, teflon or the like, which are inert and readily molded or cast to shape and which provide hard, smooth and easily cleanable surfaces ideal for use in the processing of foods.

The base has an imperforate top surface area 4 which is flat, uninterrupted, and disposed in a single plane, and the base has a perforation 6 adjacent one corner, slightly beyond the area 4. Disposed over said area of the base is a mold 8 having a cavity 10, desirably circular in shape, and, off at one side of the cavity, a perforation 12 aligned with the base perforation 6. Opposite the perforation 12 an integral extension of the mold forms a handle 14.

Surmounting the mold 8 is a blade 16 which, unlike the mold, which may be made of the same kind of plastic as the base 1, is made of metal, such as stainless sheet steel, and has at one side a perforation 18 aligned with the perforations 12 and 6 of the mold and base, and has at its opposite side an extension 20 provided with a handle 22 overlying the mold handle 14 but inclined upwardly at an angle as shown in FIG. 4.

Surmounting the stacked base, mold and blade is a plate 24 having at one side a perforation 26 aligned with the perforations in the blade, mold and base and a larger opening in which is seated the bottom of a tubular hopper 28 which is of the same size and shape as the opening that forms the cavity 10 in the mold 8.

The mold 8, plate 24 and hopper 28 all may be made of the same kind of plastic material as the base 4, and the plate, mold and base are all connected together by a pivot pin 30 which is topped by an enlarged head and stands down through the aligned perforations in the plate, mold and base and is latched in the perforations thereof by the latching detent 32, as shown in FIG. 4.

By reference to FIG. 1 it will be noted that substantially diametrically opposite the pivot pin 30 there is provided a pin 34 upstanding from the base 1 and penetrating a slot 36 in the plate 24 so as to hold that plate in proper relation to the mold 8, with the opening in the bottom of the hopper 28 accurately aligned with the mold cavity 10, and having a shank constituting an abutment for a beveled edge 38 of the mold limiting inward movement of the mold about the pivot pin 30 to a position accurately aligned beneath the hopper bottom opening, all as best seen in FIG. 1.

Figure 2:
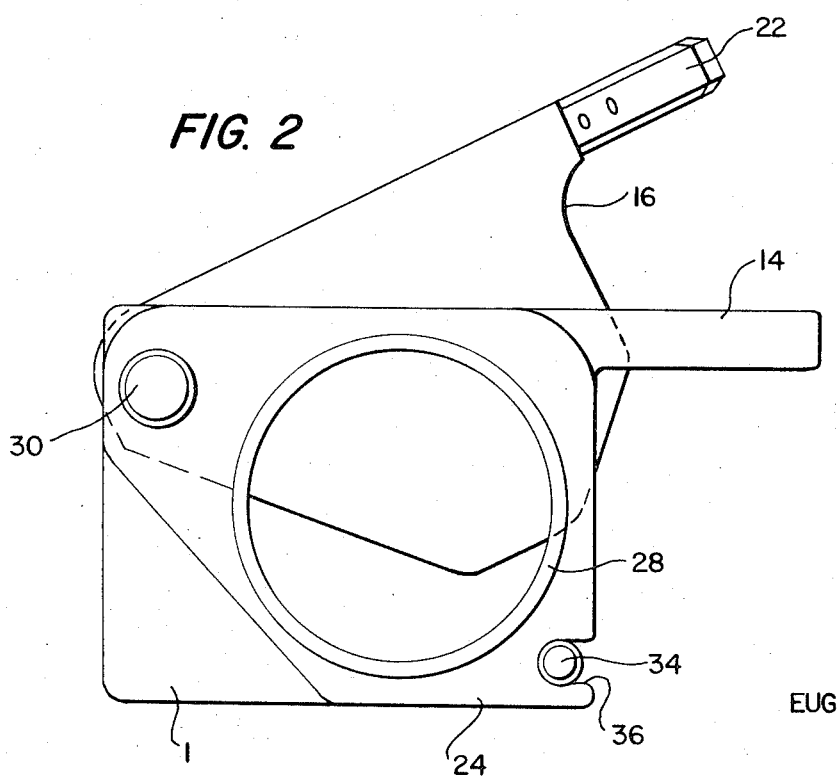
FIG. 2 is a top plan view of the device shown in FIG. 1.

To operate the device, the parts are disposed in their respective positions shown in FIG. 1, with the cover plate 24 positioned by engagement of the pin 34 in the plate slot 36 and with the handles 14 and 22 swung to their leftward limit as seen in FIG. 1, so that the mold edge 38 abuts the pin, thus aligning the mold cavity with the open bottom of the hopper 28 and with communication of hopper to mold cavity closed off by the blade 16. The hopper may then be supplied with the material of which the patties are to be made, e.g., ground meat for the production of hamburger patties, and when the first patty is to be made the blade is swung to the right, as seen in FIG. 1, through its intermediate position shown in FIG. 2, until the mold cavity is fully uncovered. The patty material is then pushed down, as by application of the plunger 40 shown in FIG. 1, until the mold cavity is filled to the density desired. The blade 16 is then pivoted to the leftward limit, thus cutting off the material in the cavity from that in the hopper. The mold handle 14 is then operated to pivot the mold outwardly, through the intermediate position shown in FIG. 3 until the cavity clears the base 1, whereupon the molded patty may be dropped or pushed out from the mold onto a plate, paper sheet or the like (not shown). The mold can then be restored to its original position, with the blade left in cavity-uncovering position, for a repetition of the operation in the production of a second patty.

Cleaning the parts is facilitated by unlatching and removing the pivot pin 30 and sliding the plate 24 with its hopper out from engagement of the slot about the pin 34, and then lifting the blade and the mold from the base.

Figure 5:
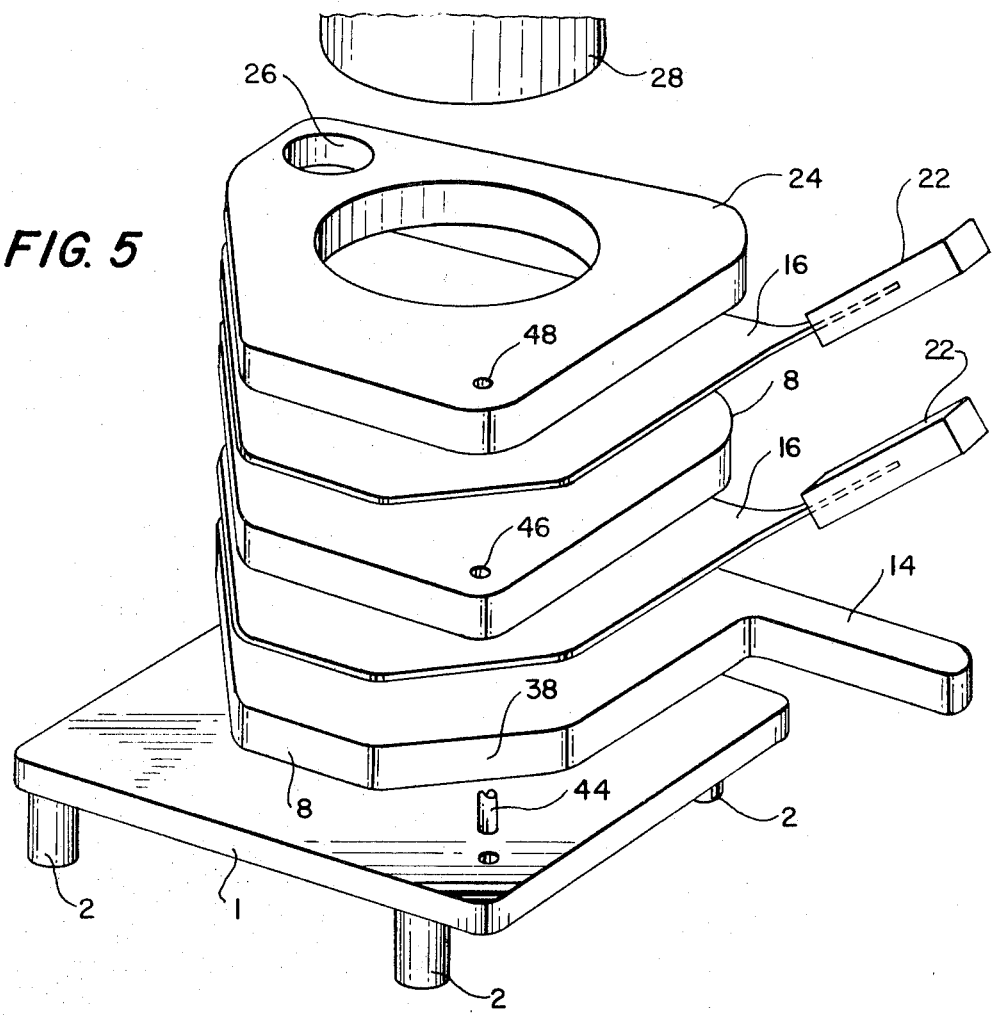
FIG. 5 is a perspective view, in exploded form of a device embodying the principles of the invention, designed for simultaneous multiple patty production.

It will be noted that use of the foregoing embodiment of the invention requires a complete operation of tamping the material and pivoting the blade and mold for each patty made. This may not be objectionable where the device is intended for use to a limited extent, as for example by the housewife in the kitchen of a small family, but where considerably greater production is required, as in a commercial establishment, the device may be modified, within the principles of the invention, to the form shown in FIGS. 5 and 6, for the simultaneous production of a plurality of patties.

In this multiple embodiment, the parts and their relationship and mode of operation are substantially the same as in the single patty form of FIGS. 1–4, but the device differs by including multiple molds and blades. The molds and blades may be provided in any reasonable number. For simplicity of disclosure, only two molds 8 and two blades 16 are shown, mounted in stacked relation on the base 1, over the imperforate surface 4 thereof, beneath the hopper opening in the cover plate.

The molds, blades and plate are provided with pivot pin perforations as hereinabove described, and all these parts are held in assembled relation by a pivot pin 42 which in this case is necessarily considerably longer than the otherwise similar pin 30. A holding and abutment pin 44, similarly longer than the otherwise identical pin 34, holds the molds in accurately cavity-aligned relation and limits inward movement of the blades.

It is believed the operation of the multiple embodiment will be obvious from the explanation hereinabove of the use of the single form. It is to be noted, however, that swinging the molds and blades outwardly when the molds are filled requires the preliminary step of withdrawing the pin 44 from the openings 46 in the molds 8, and the pin is to be removed also from the cover plate opening 48 when the device is disassembled for cleaning.

It may also be noted that, after all the molds of the multiple embodiment are filled, all may be swung out together to base-clearing, discharge position, or they may be swung out individually to that position, with or without the blades left in position supporting the patties in the respective cavities.

Figure 6:
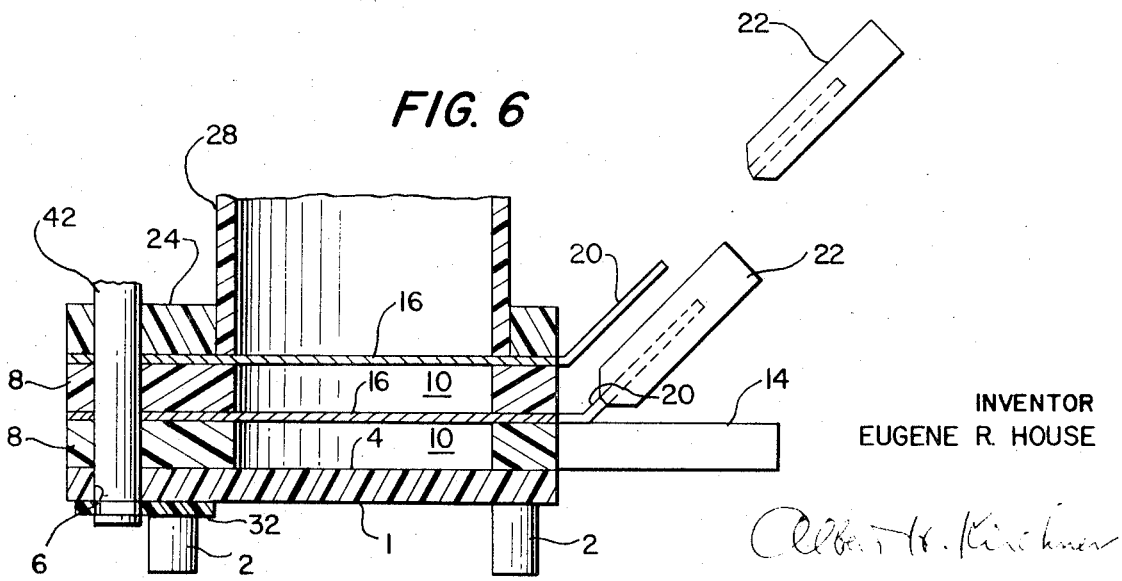
FIG. 6 is a central vertical cross sectional view, like that of FIG. 4, but taken through the multiple form device of FIG. 5 with the parts in assembled relation.

Handles 22 may be provided for the blades in the multiple embodiment, and it is convenient to make them slotted for ready attachment and detachment relation with the blade extensions 20 as shown in FIG. 6. Thus a single handle 22 will suffice for the whole device, regardless of the number of blades. The thickness of the molds makes it easy to move them individually outwardly if desired, and of course if all the stacked assembly of molds and blades is to be moved outwardly as a unit, the single integral handle 14 of the bottommost mold is all that is needed.

It is to be understood that minor alterations in form, proportions and details, and additions and subtractions, may be made in the embodiments selected to illustrate the invention without departing from the spirit thereof or the scope of the appended claims.

I claim:

1. A molding device for producing patties of comminuted comestibles and the like comprising a base having an uninterrupted single flat horizontal imperforate area and a vertical pivot pin perforation at one side of said area, a mold having a single uninterrupted through opening providing a molding cavity disposed on said area of the base surrounded by a continuous retaining side wall surrounding said imperforate area of the base and having a pivot pin perforation extending vertically through said side wall, a cutting blade disposed across the top of the mold and having a pivot pin perforation at one side thereof, a plate disposed on top of the blade and having a through opening and a pivot pin perforation at one side thereof, a loading hopper upstanding from the plate and having a bottom opening registering with the molding cavity in the mold, all of said perforations being axially aligned, and a pivot pin standing through all of said perforations, whereby the blade may be pivoted to open the mold cavity to the hopper opening for loading the cavity from the hopper and then be pivoted back to cut material in the cavity off from the hopper, and whereby the mold may then be pivoted out beyond the base for dropping the patty molded therein.

2. A molding device as claimed in claim 1, including an abutment upstanding from the base opposite the pivot pin and forming an abutment for the side wall of the mold limiting inward pivotal movement of the mold to a position in which the cavity is accurately aligned with the through opening in the plate.

3. A molding device as claimed in claim 2, in which said abutment is a pin upstanding from the base and through the plate and is removable for separation of the plate for cleaning.

4. A molding device as claimed in claim 1, including outstanding handles on the mold and the blade for swinging the mold and blade respectively about the pivot pin.

5. A molding device as claimed in claim 4, in which said handles are substantially vertically aligned and the handle of the mold extends in the plane of the mold and the handle of the blade extends at an upward inclination to facilitate grasping by the operator of the device.

6. A molding device as claimed in claim 1, including a plurality of molds in vertically stacked relation, and a plurality of blades, one for each mold.

7. A molding device as claimed in claim 6, including an elongated pin upstanding from the base opposite the pivot pin and standing through openings aligned in the plate and in each mold above the lowermost, said elongated pin constituting an abutment for the side wall of the lowermost mold limiting inward movement of said mold to a position in which its cavity is accurately aligned with the through opening in the plate and similarly aligning the upper molds, and being removable to permit outward pivotal movement of said upper molds.

8. A molding device as claimed in claim 7, in which each of said blades is formed with a surface opposite the pivot pin perforation therein adapted to engage said abutment pin and thereby limit inward pivotal movement of the blade.

9. A molding device as claimed in claim 6, including outstanding handles on the lowermost mold and each of the blades, the handle on the lowermost mold extending substantially horizontally, and the handles on the blades extending at an upward inclination and in substantially vertical alignment with the lowermost mold handle.

* * * * *